US012621142B2

(12) United States Patent
Rademacher et al.

(10) Patent No.: US 12,621,142 B2
(45) Date of Patent: May 5, 2026

(54) SYSTEM AND METHOD FOR PRIVATELY HOSTING MACHINE LEARNING MODELS AND COLLABORATIVE COMPUTATIONS

(71) Applicant: IDEEM, Inc., Kansas City, MO (US)

(72) Inventors: Andrew Rademacher, Kansas City, MO (US); Gharib Gharibi, Overland Park, KS (US); Craig Gentry, New York, NY (US); Riddhiman Das, Parkville, MO (US)

(73) Assignee: Agentic Healthcare, Inc., Los Angeles, CA (US)

( * ) Notice: Subject to any disclaimer, the term of this patent is extended or adjusted under 35 U.S.C. 154(b) by 47 days.

(21) Appl. No.: 18/899,444

(22) Filed: Sep. 27, 2024

(65) Prior Publication Data

US 2025/0106019 A1     Mar. 27, 2025

Related U.S. Application Data

(60) Provisional application No. 63/540,787, filed on Sep. 27, 2023.

(51) Int. Cl.
H04L 9/08          (2006.01)
(52) U.S. Cl.
CPC .................................... H04L 9/088 (2013.01)
(58) Field of Classification Search
CPC ...................................................... H04L 9/088
See application file for complete search history.

(56) References Cited

U.S. PATENT DOCUMENTS

| | | | | |
|---|---|---|---|---|
| 11,113,400 B1 * | 9/2021 | Emelyanov | ............. | G06F 21/64 |
| 2006/0253704 A1 * | 11/2006 | Kempf | .................. | H04L 9/3247 |
| | | | | 713/158 |
| 2018/0183578 A1 * | 6/2018 | Chakrabarti | .......... | H04L 9/0861 |
| 2018/0183580 A1 * | 6/2018 | Scarlata | .................. | G06F 21/53 |
| 2018/0247082 A1 * | 8/2018 | Durham | .................. | G06F 21/53 |
| 2018/0255023 A1 * | 9/2018 | Whaley | .............. | H04L 63/0421 |
| 2020/0259799 A1 * | 8/2020 | Li | .......................... | H04L 9/0897 |
| 2021/0019166 A1 * | 1/2021 | Kataria | ............... | G06F 21/6209 |
| 2025/0007897 A1 * | 1/2025 | Briongos | ............... | H04L 9/085 |
| 2025/0343678 A1 * | 11/2025 | Rush | ..................... | H04L 9/0894 |

OTHER PUBLICATIONS

Gharibi et al., "TripleBlind: A Privacy-Preserving Framework for Decentralized Data and Algorithms", Proceedings of Machine Learning Research 176:343-348, 2022 NeurIPS 2021 Competition and Demonstration Track. (Year: 2022).*

* cited by examiner

*Primary Examiner* — Chau Le

(57)          ABSTRACT

Systems and methods are disclosed for offering a secure model as a service. A system can be configured to implement, via a trusted execution environment comprising an enclave virtual machine and a customer key host, a distributed privacy policy in which a master decryption key is split-shared between the trusted execution environment the customer key host; perform a decryption of the master decryption key according to the distributed privacy policy to obtain a decrypted master key; and, based on the decrypted master key, perform, in the trusted execution environment, a private collaborative computation using one or more of customer data and a customer model. Secure multiparty computation can be used to perform the decryption of the master decryption key.

20 Claims, 6 Drawing Sheets

200

100

102

200

300

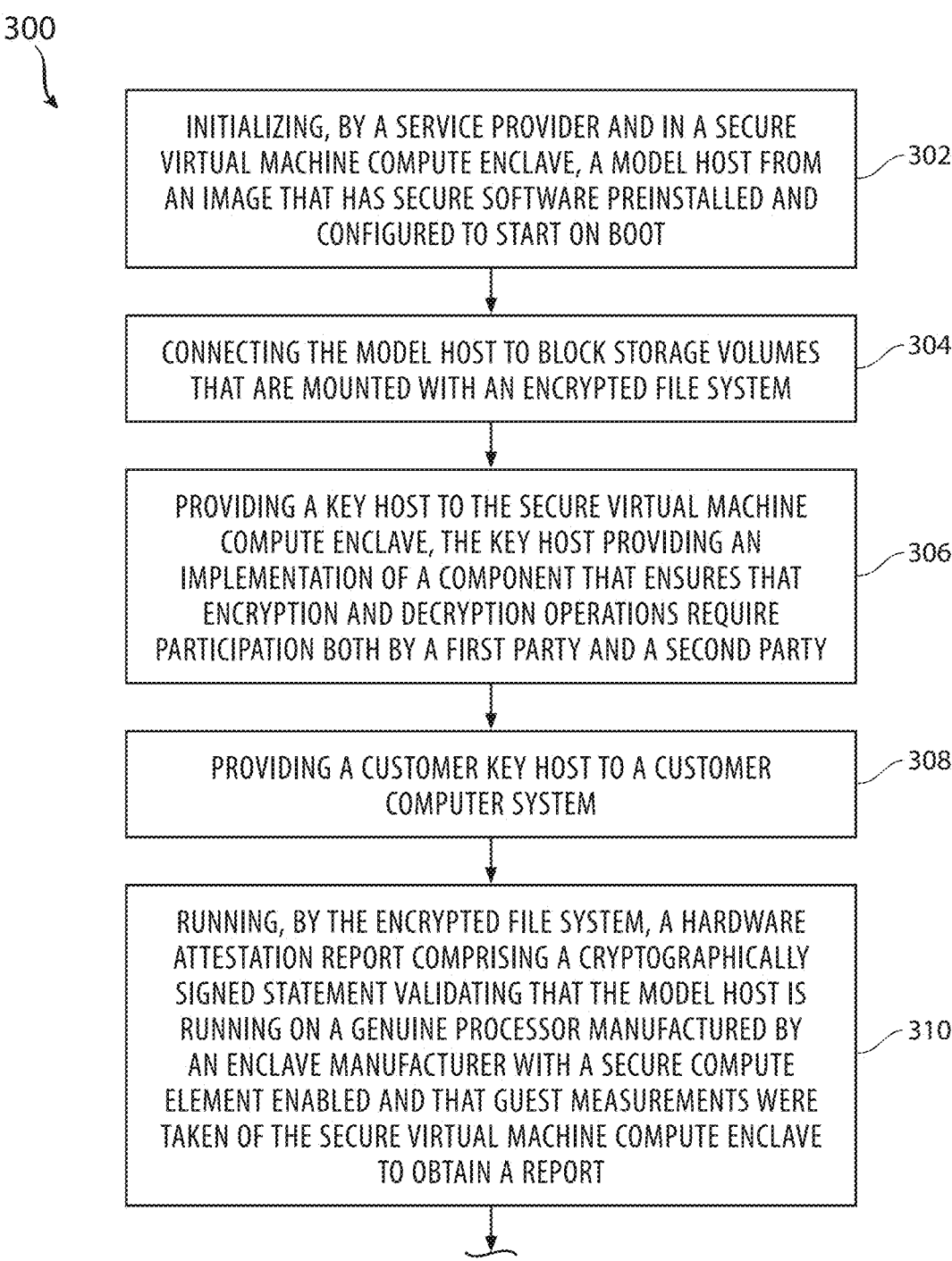

INITIALIZING, BY A SERVICE PROVIDER AND IN A SECURE VIRTUAL MACHINE COMPUTE ENCLAVE, A MODEL HOST FROM AN IMAGE THAT HAS SECURE SOFTWARE PREINSTALLED AND CONFIGURED TO START ON BOOT — 302

CONNECTING THE MODEL HOST TO BLOCK STORAGE VOLUMES THAT ARE MOUNTED WITH AN ENCRYPTED FILE SYSTEM — 304

PROVIDING A KEY HOST TO THE SECURE VIRTUAL MACHINE COMPUTE ENCLAVE, THE KEY HOST PROVIDING AN IMPLEMENTATION OF A COMPONENT THAT ENSURES THAT ENCRYPTION AND DECRYPTION OPERATIONS REQUIRE PARTICIPATION BOTH BY A FIRST PARTY AND A SECOND PARTY — 306

PROVIDING A CUSTOMER KEY HOST TO A CUSTOMER COMPUTER SYSTEM — 308

RUNNING, BY THE ENCRYPTED FILE SYSTEM, A HARDWARE ATTESTATION REPORT COMPRISING A CRYPTOGRAPHICALLY SIGNED STATEMENT VALIDATING THAT THE MODEL HOST IS RUNNING ON A GENUINE PROCESSOR MANUFACTURED BY AN ENCLAVE MANUFACTURER WITH A SECURE COMPUTE ELEMENT ENABLED AND THAT GUEST MEASUREMENTS WERE TAKEN OF THE SECURE VIRTUAL MACHINE COMPUTE ENCLAVE TO OBTAIN A REPORT — 310

TRANSMITTING, FROM THE ENCRYPTED FILE SYSTEM AND
TO THE KEY HOST, THE REPORT TO SIGNAL THAT IT IS SAFE
TO PARTICIPATE IN DECRYPTION OF THE ENCRYPTED FILE
SYSTEM USED BY THE MODEL HOST
─312

INITIATING A TRUSTED EXECUTION ENVIRONMENT ON
THE SECURE VIRTUAL MACHINE COMPUTE ENCLAVE
BY IMPLEMENTING A DISTRIBUTED ACCESS POLICY
ENFORCEMENT TO THE SECURE VIRTUAL MACHINE COMPUTE
ENCLAVE BETWEEN AT LEAST TWO THE FIRST PARTY AND
THE SECOND PARTY FOR DATA ACCESS OR COMPUTATION
AUTHORIZATION IN WHICH BOTH THE FIRST PARTY AND
THE SECOND PARTY EXCHANGE DATA TO UNLOCK A MASTER
DECRYPTION KEY
─314

FIG. 3A *(Continued)*

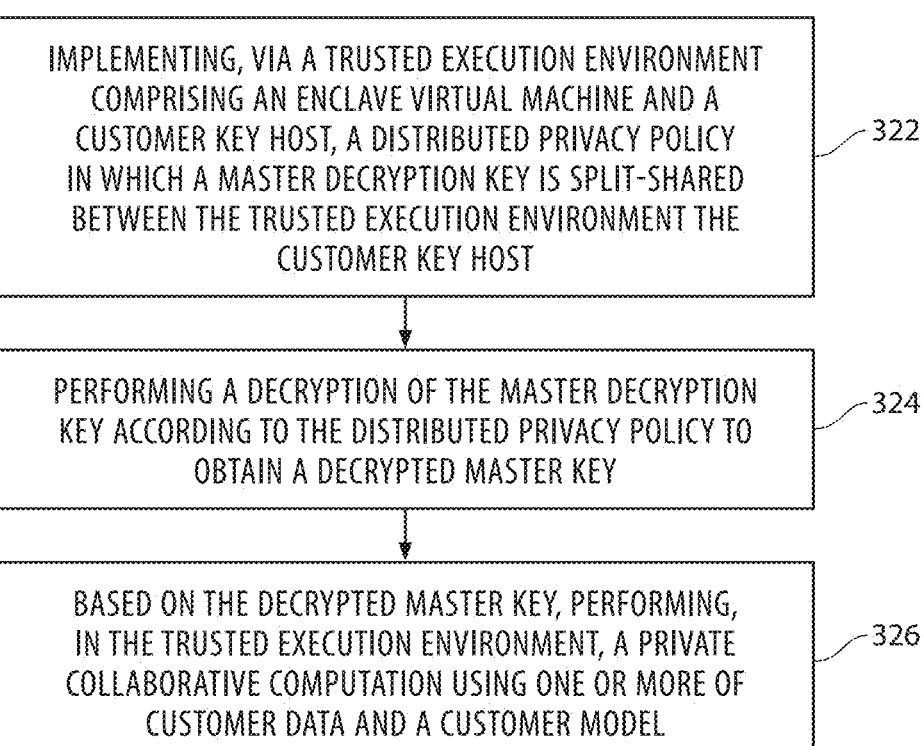

320

IMPLEMENTING, VIA A TRUSTED EXECUTION ENVIRONMENT COMPRISING AN ENCLAVE VIRTUAL MACHINE AND A CUSTOMER KEY HOST, A DISTRIBUTED PRIVACY POLICY IN WHICH A MASTER DECRYPTION KEY IS SPLIT-SHARED BETWEEN THE TRUSTED EXECUTION ENVIRONMENT THE CUSTOMER KEY HOST — 322

PERFORMING A DECRYPTION OF THE MASTER DECRYPTION KEY ACCORDING TO THE DISTRIBUTED PRIVACY POLICY TO OBTAIN A DECRYPTED MASTER KEY — 324

BASED ON THE DECRYPTED MASTER KEY, PERFORMING, IN THE TRUSTED EXECUTION ENVIRONMENT, A PRIVATE COLLABORATIVE COMPUTATION USING ONE OR MORE OF CUSTOMER DATA AND A CUSTOMER MODEL — 326

FIG. 3B

SYSTEM AND METHOD FOR PRIVATELY HOSTING MACHINE LEARNING MODELS AND COLLABORATIVE COMPUTATIONS

PRIORITY CLAIM

The present application claims priority to U.S. Provisional Patent Application No. 63/540,787, filed on Sep. 27, 2023, the contents of which are incorporated herein by reference.

TECHNICAL FIELD

The present disclosure relates to privately hosting machine learning models and the use of secure collaborative computations to provide a "secure model as a service".

BACKGROUND

Many enterprises are not sufficiently technically sophisticated to manage their own machine learning models and thus they desire to outsource the task. This can lead to issues with hacking or loss of privacy with respect to their machine learning models.

The surprising pace of advancement in the development of large language models (LLMs) and, more generally, Generative artificial intelligence (GenAI), have led many industries to consider how they ought to adapt and adopt these new technologies. It is clear that AI will play many new roles, across multiple industries, but the specifics are still being determined in real time. While many are rushing to gain a competitive edge, others are waiting to see what happens. A large and immediate concern for those still on the sidelines is privacy. Many companies are hesitant to send sensitive, even proprietary data and prompts to large providers like OpenAI or Microsoft.

Such concerns can be addressed by leveraging open-sourced LLMs and hosting them on premise. There are multiple open-source foundation models available, such as Llama 2 by Meta AI. However, many companies do not have the required expertise to locally fine-tune and host their own models, build front-ends for their users, employ semantic search to reduce hallucinations, or to address any other number of technical challenges and privacy concerns that arise when deploying GenAI solutions in an enterprise environment.

BRIEF SUMMARY

Disclose is a system and method for providing one or more of a secure approach to hosting machine learning models and a secure collaborative computation strategy. The disclosed approach enables an ability to offer "secure models as a service" to parties which can simply the management of models for companies without an enterprise needing to trust a service provider.

The present disclosed approach relates to a system and method for securely hosting computations and/or securing collaborative computations inside a trusted execution environment (TEE), such as a secure enclave or trusted domain like AMD SEV-SNP or Intel TDX. As a motivating use case, many enterprises are not technically sophisticated to manage their own machine learning models, and would like to outsource that task. In private collaborative computations, several parties have inputs to a computation. For example, one party may have a private machine learning model (e.g., large language models (LLM)) and the other party a private input for the model. All parties want to keep their inputs private despite performing the computation using either other's data or model.

TEEs are typically implemented as isolated regions of memory within a computer system that allow code to run while protected from external threats, including untrusted host platforms. However, current TEEs are not well-equipped to deal with a setting where mutually untrusting parties wish to co-manage a TEE or use a TEE to perform a collaborative computation. TEEs are designed to protect a guest computation from the host machine. In practice, this is used to protect the owner of a virtual machine from the owner of a physical machine. It cannot protect the virtual machine from itself, which in turn means that it cannot protect co-owners of the same virtual machine from each other.

This disclosure introduces a system and method for using a TEE in combination with cryptographic techniques to securely distribute TEE management across several parties, and thereby allow secure outsourcing of model management and private collaborative computations. In one example, secure multi-party computation can be used to enable decryption of a master key to enable the parties to co-manage the TEE.

In some aspects, the techniques described herein relate to a method of managing an artificial intelligence model lifecycle, the method including: initializing, by a service provider and in a secure virtual machine compute enclave, a model host from an image that has secure software preinstalled and configured to start on boot; connecting the model host to block storage volumes that are mounted with an encrypted file system; providing a key host to the secure virtual machine compute enclave, the key host providing an implementation of a component that ensures that encryption and decryption operations require participation both by a first party and a second party; providing a customer key host to a customer computer system; running, by the encrypted file system, a hardware attestation report including a cryptographically signed statement validating that the model host is running on a genuine processor manufactured by an enclave manufacturer with a secure compute element enabled and that guest measurements were taken of the secure virtual machine compute enclave to obtain a report; transmitting, from the encrypted file system and to the key host, the report to signal that it is safe to participate in decryption of the encrypted file system used by the model host; and initiating a trusted execution environment on the secure virtual machine compute enclave by implementing a distributed access policy enforcement to the secure virtual machine compute enclave between at least two the first party and the second party for data access or computation authorization in which both the first party and the second party exchange data to unlock a master decryption key.

In some aspects, the techniques described herein relate to a system for managing an artificial intelligence model lifecycle, the system including: at least one memory; and at least one processor coupled to the at least one memory and configured to: initialize, by a service provider and in a secure virtual machine compute enclave, a model host from an image that has secure software preinstalled and configured to start on boot; connect the model host to block storage volumes that are mounted with an encrypted file system; provide a key host to the secure virtual machine compute enclave, the key host providing an implementation of a component that ensures that encryption and decryption operations require participation both by a first party and a second party; provide a customer key host to a customer computer system; run, by the encrypted file system, a hardware attestation report including a cryptographically signed statement validating that the model host is running on a genuine processor manufactured by an enclave manufacturer with a secure compute element enabled and that guest measurements were taken of the secure virtual machine compute enclave to obtain a report; transmit, from the encrypted file system and to the key host, the report to signal that it is safe to participate in decryption of the encrypted file system used by the model host; and initiate a trusted execution environment on the secure virtual machine compute enclave by implementing a distributed access policy enforcement to the secure virtual machine compute enclave between at least two the first party and the second party for data access or computation authorization in which both the first party and the second party exchange data to unlock a master decryption key.

In some aspects, the techniques described herein relate to a non-transitory computer-readable medium having stored thereon instructions that, when executed by one or more processors, cause the one or more processors to: initialize, by a service provider and in a secure virtual machine compute enclave, a model host from an image that has secure software preinstalled and configured to start on boot; connect the model host to block storage volumes that are mounted with an encrypted file system; provide a key host to the secure virtual machine compute enclave, the key host providing an implementation of a component that ensures that encryption and decryption operations require participation both by a first party and a second party; provide a customer key host to a customer computer system; run, by the encrypted file system, a hardware attestation report including a cryptographically signed statement validating that the model host is running on a genuine processor manufactured by an enclave manufacturer with a secure compute element enabled and that guest measurements were taken of the secure virtual machine compute enclave to obtain a report; transmit, from the encrypted file system and to the key host, the report to signal that it is safe to participate in decryption of the encrypted file system used by the model host; and initiate a trusted execution environment on the secure virtual machine compute enclave by implementing a distributed access policy enforcement to the secure virtual machine compute enclave between at least two the first party and the second party for data access or computation authorization in which both the first party and the second party exchange data to unlock a master decryption key.

In some aspects, the techniques described herein relate to a method of providing secure models as a service, the method including: implementing, via a trusted execution environment including an enclave virtual machine and a customer key host, a distributed privacy policy in which a master decryption key is split-shared between the trusted execution environment the customer key host; performing a decryption of the master decryption key according to the distributed privacy policy to obtain a decrypted master key; and based on the decrypted master key, performing, in the trusted execution environment, a private collaborative computation using one or more of customer data and a customer model.

In some aspects, the techniques described herein relate to a system for offering a secure model as a service, the system including: at least one memory; and at least one processor coupled to the at least one memory and configured to: implement, via a trusted execution environment including an enclave virtual machine and a customer key host, a distributed privacy policy in which a master decryption key is split-shared between the trusted execution environment the customer key host; perform a decryption of the master decryption key according to the distributed privacy policy to obtain a decrypted master key; and based on the decrypted master key, perform, in the trusted execution environment, a private collaborative computation using one or more of customer data and a customer model.

In some aspects, the techniques described herein relate to a non-transitory computer-readable medium having stored thereon instructions that, when executed by one or more processors, cause the one or more processors to: implement, via a trusted execution environment including an enclave virtual machine and a customer key host, a distributed privacy policy in which a master decryption key is split-shared between the trusted execution environment the customer key host; perform a decryption of the master decryption key according to the distributed privacy policy to obtain a decrypted master key; and based on the decrypted master key, perform, in the trusted execution environment, a private collaborative computation using one or more of customer data and a customer model.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 3A illustrates a method of providing a secure execution environment according to certain aspects of this disclosure;

FIG. 3B illustrates another method of providing a secure execution environment according to certain aspects of this disclosure.

DETAILED DESCRIPTION

Figure 1:
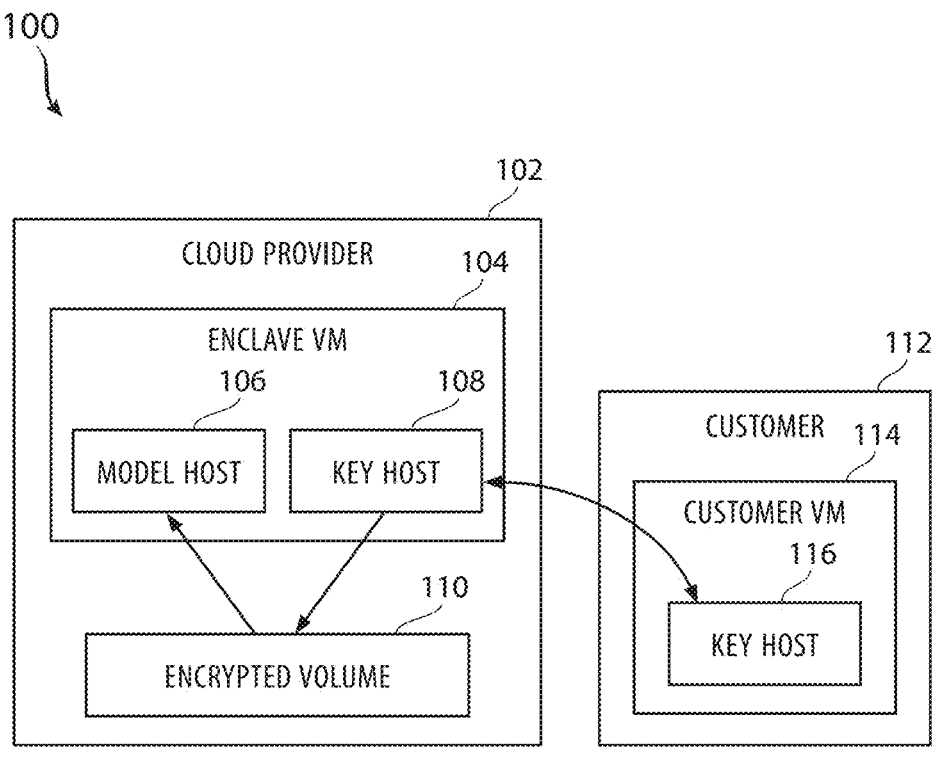
FIG. 1 illustrates an overview of the major components involved in mounting an encrypted volume to the model host according to certain aspects of this disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Some customers of the use of AI models require access to the complete model lifecycle but are unwilling to send information to OpenAI and other similar entities. There is a need for a service provider to offer a secure environment for hosting large models on their behalf. This disclosure introduces a system that is built, in part, using a secure enclave. However, the disclosed approach offers a significant privacy guarantee that is unique in the space. The access key to the enclave is secured using a multiparty approach such as, for example, secure multiparty computation (SMPC). The SMPC approach can be called a "ZeroTrust Secure Module" or "ZSM" for convenience.

The incorporation of ZSM can provide a technical guarantee that service provider and its employees cannot access the model or data that reside in the enclave, which they operate on behalf of the customer. This guarantee persists even if the service provider's own servers were to become compromised in a cyber-attack. Moreover, this guarantee ensures protection against consent-and-gag orders, whereby the government can demand that a service provider provide customer data without informing the customer. The use of SMPC ensures that customer participation is needed to access the data through the TEE. The disclosed approach allows businesses to deploy cutting-edge GenAI solutions, while avoiding the most significant risks to data privacy.

Enabling private collaborative computations requires a secure environment that maintains the privacy every party's inputs. Example inputs can include a machine learning model from one party and an input to the model from another party. At first glance, the trusted execution environments (TEEs) such as AMD SEV-SNP and Intel TDX seem designed to provide such an environment. However, again, although a TEE protects the TEE owner's computation from external threats even including the host (such as a cloud service provider), ownership and management of the TEE is typically all-or-nothing. TEEs do not inherently provide a secure environment for a setting involving multiple parties, where the parties are unwilling to trust any single party to manage the TEE, as in the case of private collaborative computations. The disclosed approach uses TEEs in combination with a multiparty secure approach that can include, among other options, secure multiparty computation (SMPC) to get the best of both worlds for private collaborative computation.

In particular, the disclosed approach provides the performance and ease-of-implementation advantages of TEEs relative to SMPC (which can be very expensive computationally and communication-wise for big computations), together with distributive security of SMPC. SMPC, unlike TEEs, provide a technical mechanism that requires several distrusting parties to agree to an action before the action is performed on the TEE.

FIG. 1 illustrates an overview of the major components 100 involved in mounting an encrypted volume to a model host. A cloud provider 102 can be any cloud provider such as Amazon Web Services (AWS), Google Cloud, IBM Cloud and so forth. Within the cloud provider, the service provider creates an enclave virtual machine 104 that can also have deployed therein a model host 106 and a key host 108. The key host 108 is used to access or provide authorization to access an encrypted volume 110. A customer system 112 can include as provided by the service provider a customer virtual machine 114 that also includes a customer key host 116. The multiparty communication such as SMPC can be used to coordinate the decryption of keys between the key host 108 and the customer key host 116 to enable co-management of the enclave virtual machine 104.

As noted above, one example way of providing multiparty secure communications is through SMPC. SMPC operates as a secret sharing scheme allows the holder of a secret to distribute it to two (or more) parties, while (1) guaranteeing that neither party, on their own, learns anything at all about the secret and (2) if the two parties join together, they can recover the secret in its entirety.

More formally, a secret sharing scheme consists of two algorithms. The first algorithm is Share(s). the Share(s) algorithm, given a secret s, outputs two secret shares, $S_1$, $S_2$. The second algorithm is Reconstruct ($S_1$, $S_2$). The Reconstruct ($S_1$, $S_2$) operates by, given two secret shares, outputting the original secret s.

A correctness requirement says that Pr[Reconstruct (Share(s))]=s]=1. A security requirement says that for all pairs of secrets, r, s, and for all possible secret shares $S_1$, Pr[$S_1 \in$Share(s)]=Pr[$S_1 \in$Share(r)]. That is, each secret share is independent of the secret, and thus reveals no information about the secret, at all.

The simplest example of a secret sharing scheme is the XOR operation (ß) on binary strings. Given a secret s$\in$ {0, 1}$^n$, Share(s) samples $S_1$ at random, and fixes $S_2$=$S_1$ßs. It is worth noting that in applications where the secret s is itself randomly sampled, the two shareholders can sample the shares of s independently, without anyone ever learning s. In this case, party one randomly chooses $S_1$, and party two randomly chooses $S_2$. The secret s is defined implicitly by $S_1$ß$S_2$, and can be reconstructed when needed.

SMPC illustrates a branch of modern cryptography that deals with computing on data while it remains encrypted (versus historical uses of cryptography to protect data at rest or in transit). Formally, if two parties hold input data $X_1$ and $X_2$, and they wish to evaluate some computer program C on the data, a secure computation protocol allows them each to learn C($X_1$, $X_2$) without revealing either $X_1$ to party two, or $X_2$ to party one. Technically, the program C, by its definition, likely reveals something about the inputs—otherwise there is no purpose to perform the evaluation of C in the first place. The guarantee is that nothing additional about the inputs is learned, beyond the output of C.

One can use secure multiparty computation to compute arbitrary programs over the hidden data. In one example applicable to the introduction of a secure model as a service, one can use SMPC to securely distribute the evaluation of encryption and decryption algorithms across multiple parties. For example, SMPC can be used in connection with Advanced Encryption Standard (AES) encryption and decryption algorithms.

In some aspects, let AES(k, m) denote an encryption algorithm that takes a 256-bit secret key k and a message m as input, and outputs the corresponding ciphertext. For simplicity, this description ignores that the encryption algorithm should be randomized, which presents no complications. Let AES* denote the modified encryption algorithm that takes secret shares of k as input: AES*($k_1$, $k_2$, m), and, then using SMPC to protect the privacy of the inputs and the computation, ultimately outputs the AES(k, m). ZSM can implement an encryption-decryption process using SMPC. By using ZSM, one can ensure that neither of the involved parties ever learns anything about the encryption key, or anything about the computation at all except the final result.

Further, in some aspects, they only learn the final result if the SMPC protocol specifies that one or more of the parties is entitled to receive the final result.

In some aspects, a partial key can reside on one of the devices disclosed herein and can be bound or assigned to that device. In the multiparty computation, the signing process can be used as a two-factor authentication approach for an event such as to authorize access to data or to perform a computation, or for some other event, even at very granular levels. The other factors could be biometric authorization such as using a fingerprint or facial recognition as in payment methods such as Apple Pay. Other modalities can be used as well such as passwords, or PINs.

As noted above, in some aspects, the system can be characterized as providing "Secure Models as a Service". The system is designed to meet the need of enterprises without the expertise to fine-tune and deploy their own models. The disclosed approach offers a system and method that allows a service provider to host and manage the complete AI lifecycle for the enterprise, from data processing to model serving, without seeing the model, the data used in fine-tuning that model, or the prompts and responses to and from the model.

The disclosed approach relies on secure enclaves to protect the data. However, the service provider does not simply manage the enclave for the enterprise. Rather, the service provider simplifies management of the enclave for the enterprise, but requires the enterprise's participation and co-management in sensitive operations. The service provider can never access the model or the data hosted inside the enclave, even though it is responsible for its administration. This guarantee is provided through the use of ZSM—i.e., the use of SMPC to secret-share (distribute) access to the contents of the hosted module between the service provider and the customer.

To ensure that the service provider is never able to see a running computation, or the content of proprietary customer data, the system maintains one or more of the following invariants for the virtual machine running the models. First, the virtual machine (i.e., the enclave virtual machine 104) is initialized from an image that has the service provider software preinstalled and set to start on boot. Second, the virtual machine is initialized from an image that has all other networking software removed, including the OpenSSH server or Open Secure Shell server.

Third, the virtual machine in some aspects is initialized from an image that has known "guest measurements," as defined by the hardware's secure compute element. In the context of virtual machines (VMs), a guest measurement refers to the process of measuring or monitoring the performance, resource usage, or state of the "guest" operating system and applications running within a VM. A guest in virtualization terminology is the virtualized environment, or the operating system and its applications, that runs on top of a hypervisor (the software layer that allows multiple VMs to run on a physical host machine). The following are common types of guest measurements: (1) CPU Utilization: Tracking how much CPU time the guest OS is using; (2) Memory Usage: Monitoring the amount of RAM being consumed by processes running in the guest; (3) Disk I/O: Measuring the read and write operations performed by the guest OS to the virtual disk; (4) Network I/O: Tracking the amount of network traffic (data sent and received) by the guest OS; and (5) Application Performance: Measuring the performance of specific applications or services running inside the guest OS. These metrics are important for capacity planning, performance tuning, and ensuring efficient resource allocation.

They can be gathered using tools provided by the hypervisor (e.g., VMware vSphere, Microsoft Hyper-V) or using monitoring agents installed within the guest operating system.

Fourth, the enclave virtual machine 104 can be connected to block storage volumes that are mounted with an encrypted file system such as encrypted volume 110.

As a consequence of removing any networked access to the enclave virtual machine 104 except through the software from the service provider, which will contain a short white list of allowable operations, any additional abilities to administrate the enclave virtual machine 104 from within is disabled. In conjunction with the memory of the virtual machine being protected by the enclave, and the file-system being encrypted, there is no method by which a service provider employee could inspect the content of a machine that is responsible for running a customer model. The machine mentioned herein is call the model host 106.

In addition to the software that runs models on behalf of the customer, the service provider also supplies an independent program called the key host 108. The key host 108 is installed either in the customer's infrastructure (the customer key host 116), or in a organizational unit within the service provider that has no connection to the operations team. The key host 108 (as well as the customer key host 116) provide an implementation of ZSM, which ensures that encryption and decryption operations require participation by both the service provider such as the cloud provider 102 and the customer system 112.

Figure 2:
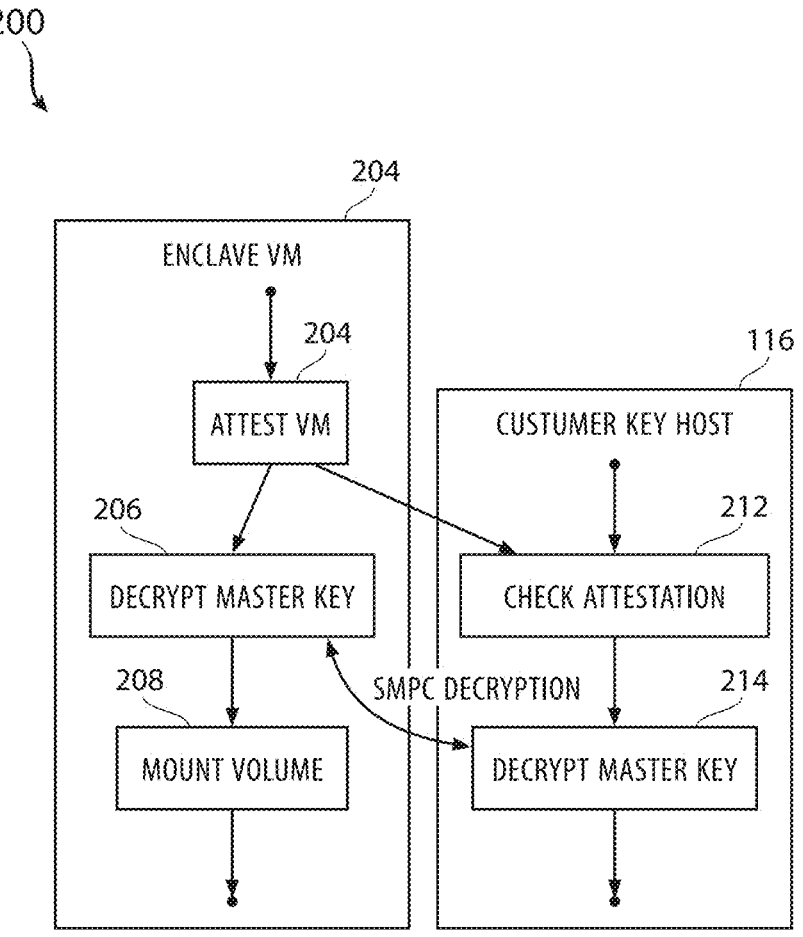
FIG. 2 illustrates an order of operations that are performed by enclave and customer machines in order to mount encrypted volumes to the enclave according to certain aspects of this disclosure.

FIG. 2 illustrates an order of operations 200 that are performed by the enclave virtual machine 104 and the customer machine (not shown) via the customer key host 116 in order to mount encrypted volumes to the enclave virtual machine 104. Since the file-system used by the model host 106 is encrypted, it must acquire a decryption key in order to boot. It does so by running a hardware attestation report to attest the virtual machine 204. The report contains a cryptographically signed statement from the hardware, validating that a) the model host 106 is running on a genuine processor manufactured by the enclave manufacturer (e.g., AMD/Intel) with the secure compute element enabled, and b) that the guest measurements were taken of the enclave virtual machine 104. After acquiring the report, it is transmitted to a customer key host 116 as proof that it is safe to participate in decryption of the file-system (the encrypted volume 110) used by the model host 106. The customer key host 116 checks the attestation 212 and then employs a multiparty computation technique (i.e., ZSM or SMPC) to distributively decrypt the file-system or as one party to the multi-party process, decrypts the master key 214. The enclave virtual machine 104 representing the other party to the multi-party process, also decrypts the master key 206 to mount the main volume 208.

Due to the fact that ZSM decryption is more computationally expensive than normal decryption (that is not inside SMPC), in some aspects, the approach uses ZSM to decrypt an encrypted master secret key. The encrypted master secret key can be stored in the enclave virtual machine 104, whereupon the master secret key is used to decrypt the file-system using conventional decryption. The master decryption key never leaves the enclave virtual machine 104 and is deleted after use, leaving only the encrypted master secret key, ready to be decrypted again in later transactions.

In the absence of such a report, the customer key host 116 will refuse to participate in the decryption of the file-system. This ensures that if a bad actor such as a rogue employee of either organization, or an outsider that has gained access to their networks, were to copy the file-system from the model host 106, they would not be able to open it. If the bad actor were to take a copy of the model host's image, and attempt to run that image on their stolen file-system, the bad actor would hold an image that contains no tools like OpenSSH for facilitating access. It would necessarily be running in an enclave environment, so the memory would not be visible to their hypervisor, and decryption of the file-system cannot take place without the customer's involvement in the ZSM decryption. The attacker would be left with no usable materials to extract the intellectual property of the customer.

The secure model hosting service can be integrated with additional functionalities related to models, including fine-tuning large models to support new, customer-specific data that the foundation model could not access (including fine-tuning with differential privacy), building a database of vector embeddings to support semantic search on customer-specific data, and prompt engineering features such as privacy-aware prompt pre-processing that automatically redacts privacy identifiable information and other sensitive user-level information from the prompt.

In some aspects, an enterprise may want to enable several stakeholders within the enterprise itself to co-manage a TEE for privacy sensitive computations. Often, in an enterprise setting, there are several stakeholders who need to decide collectively whether to allow a sensitive computation. For example, one stakeholder may be an employee of the data owner that wants the result of the computation. Another stakeholder may be a data officer who sets a policy around role-based access control of company data. Yet another stakeholder may be a security officer that may shut down access when there are security threats. In an enterprise setting, placing control over sensitive data in a single employee's hands is typically not the right solution. It invites key and data compromise, leads to a fragmented and ad hoc key management system, and decouples key use from policy enforcement. A better approach is to allow each stakeholder to make sure its policies are satisfied before participating in key use.

A better key management system for enterprise can implement two main properties: 1) the system can ensure that each stakeholder's requirements are met by distributing key use across the stakeholders, and 2) the system can simplify and unify key management by providing a single pane of glass over policies for all key stores. SMPC-based co-management of TEEs can provide such a key management for enterprise.

Similar to the "secure model as a service" context, one can use ZSM to protect the interests of several intra-enterprise stakeholders by using ZSM to instantiate one or more key hosts (such as the key host 108 or the customer key host 116) that guards access to a computation host (which can be presented as the model host 106 in FIG. 1). The use of a computation host can be more general. The application of ZSM ensures that access requires cooperation of all or at least a threshold number of stakeholders that hold secret shares. ZSM naturally supports intra-enterprise monitoring of key use and misuse, through the inherently interactive nature of SMPC.

In some aspects, several mutually distrusting parties want to perform a private collaborative computation. One party, or a separate service provider such as the service provider, facilitates initialization of one or more of a key host 108, a customer key host 116, a computation host, a model host 106 or other hosts with ZSM distributing control across participating parties.

FIG. 3A illustrates a method of providing a secure execution environment 300 according to certain aspects of this disclosure. The method can be practiced by a system or computing system such one or more of a computing system 400, a cloud provider 102, an enclave virtual machine 104, a model host 106, a key host 118, an encrypted volume 110, a customer computer system 112, a customer virtual machine 114, a customer key host 116, and/or any subcomponent or subsystem thereof.

At block 302, a system (i.e., one or more of a computing system 400, a cloud provider 102, an enclave virtual machine 104, a model host 106, a key host 118, an encrypted volume 110, a customer computer system 112, a customer virtual machine 114, a customer key host 116, and/or any subcomponent or subsystem thereof) can and is configured to manage an artificial intelligence model lifecycle by initializing, by a service provider and in a secure virtual machine compute enclave, a model host from an image that has secure software preinstalled and configured to start on boot. In some aspects, the model host can be configured to run machine learning models on behalf of one of the first party or the second party.

At block 304, a system (i.e., one or more of a computing system 400, a cloud provider 102, an enclave virtual machine 104, a model host 106, a key host 118, an encrypted volume 110, a customer computer system 112, a customer virtual machine 114, a customer key host 116, and/or any subcomponent or subsystem thereof) can and is configured to manage an artificial intelligence model lifecycle by connecting the model host to block storage volumes that are mounted with an encrypted file system.

At block 306, a system (i.e., one or more of a computing system 400, a cloud provider 102, an enclave virtual machine 104, a model host 106, a key host 118, an encrypted volume 110, a customer computer system 112, a customer virtual machine 114, a customer key host 116, and/or any subcomponent or subsystem thereof) can and is configured to manage an artificial intelligence model lifecycle by providing a key host to the secure virtual machine compute enclave, the key host providing an implementation of a component that ensures that encryption and decryption operations require participation both by a first party and a second party.

At block 308, a system (i.e., one or more of a computing system 400, a cloud provider 102, an enclave virtual machine 104, a model host 106, a key host 118, an encrypted volume 110, a customer computer system 112, a customer virtual machine 114, a customer key host 116, and/or any subcomponent or subsystem thereof) can and is configured to manage an artificial intelligence model lifecycle by providing a customer key host to a customer computer system.

At block 310, a system (i.e., one or more of a computing system 400, a cloud provider 102, an enclave virtual machine 104, a model host 106, a key host 118, an encrypted volume 110, a customer computer system 112, a customer virtual machine 114, a customer key host 116, and/or any subcomponent or subsystem thereof) can and is configured to manage an artificial intelligence model lifecycle by running, by the encrypted file system, a hardware attestation report comprising a cryptographically signed statement validating that the model host is running on a genuine processor manufactured by an enclave manufacturer with a secure compute element enabled and that guest measurements were taken of the secure virtual machine compute enclave to obtain a report.

At block 312, a system (i.e., one or more of a computing system 400, a cloud provider 102, an enclave virtual machine 104, a model host 106, a key host 118, an encrypted volume 110, a customer computer system 112, a customer virtual machine 114, a customer key host 116, and/or any subcomponent or subsystem thereof) can and is configured to manage an artificial intelligence model lifecycle by transmitting, from the encrypted file system and to the key host, the report to signal that it is safe to participate in decryption of the encrypted file system used by the model host.

At block 314, a system (i.e., one or more of a computing system 400, a cloud provider 102, an enclave virtual machine 104, a model host 106, a key host 118, an encrypted volume 110, a customer computer system 112, a customer virtual machine 114, a customer key host 116, and/or any subcomponent or subsystem thereof) can and is configured to manage an artificial intelligence model lifecycle by initiating a trusted execution environment on the secure virtual machine compute enclave by implementing a distributed access policy enforcement to the secure virtual machine compute enclave between at least two the first party and the second party for data access or computation authorization in which both the first party and the second party exchange data to unlock a master decryption key. In some aspects, the distributed access policy enforcement to the secure virtual machine compute enclave between at least two the first party and the second party can include using secure multiparty computations between the first party and the second party exchange data to unlock the master decryption key. In some aspects, the secure multiparty computations cause the first party having data $X_1$ and the second party having data $X_2$ to learn a computing result $C(X_1, X_2)$ without the first party revealing $X_1$ to the second party or the second party revealing $X_2$ to the first party. In some aspects, $X_1$ and $X_2$ represent respective outputs from respective encryption algorithms operated by the first party or the second party.

The image only can include the secure software for networking and has all other networking software removed including an open secure shell (SSH) server. The image can include the guest measurements as defined by a hardware secure compute element. The secure software can include a white list of allowable operations.

In some aspects, a system for managing an artificial intelligence model lifecycle, the system can include at least one memory; and at least one processor coupled to the at least one memory and configured to: initialize, by a service provider and in a secure virtual machine compute enclave, a model host from an image that has secure software preinstalled and configured to start on boot; connect the model host to block storage volumes that are mounted with an encrypted file system; provide a key host to the secure virtual machine compute enclave, the key host providing an implementation of a component that ensures that encryption and decryption operations require participation both by a first party and a second party; provide a customer key host to a customer computer system; run, by the encrypted file system, a hardware attestation report comprising a cryptographically signed statement validating that the model host is running on a genuine processor manufactured by an enclave manufacturer with a secure compute element enabled and that guest measurements were taken of the secure virtual machine compute enclave to obtain a report; transmit, from the encrypted file system and to the key host, the report to signal that it is safe to participate in decryption of the encrypted file system used by the model host; and initiate a trusted execution environment on the secure virtual machine compute enclave by implementing a distributed access policy enforcement to the secure virtual machine compute enclave between at least two the first party and the second party for data access or computation authorization in which both the first party and the second party exchange data to unlock a master decryption key.

In some aspects, a non-transitory computer-readable medium having stored thereon instructions that, when executed by one or more processors, cause the one or more processors to: initialize, by a service provider and in a secure virtual machine compute enclave, a model host from an image that has secure software preinstalled and configured to start on boot; connect the model host to block storage volumes that are mounted with an encrypted file system; provide a key host to the secure virtual machine compute enclave, the key host providing an implementation of a component that ensures that encryption and decryption operations require participation both by a first party and a second party; provide a customer key host to a customer computer system; run, by the encrypted file system, a hardware attestation report comprising a cryptographically signed statement validating that the model host is running on a genuine processor manufactured by an enclave manufacturer with a secure compute element enabled and that guest measurements were taken of the secure virtual machine compute enclave to obtain a report; transmit, from the encrypted file system and to the key host, the report to signal that it is safe to participate in decryption of the encrypted file system used by the model host; and initiate a trusted execution environment on the secure virtual machine compute enclave by implementing a distributed access policy enforcement to the secure virtual machine compute enclave between at least two the first party and the second party for data access or computation authorization in which both the first party and the second party exchange data to unlock a master decryption key.

FIG. 3B illustrates a method of providing secure models as a service 320 according to certain aspects of this disclosure. The method can be practiced by a system or computing system such one or more of a computing system 400, a cloud provider 102, an enclave virtual machine 104, a model host 106, a key host 118, an encrypted volume 110, a customer computer system 112, a customer virtual machine 114, a customer key host 116, and/or any subcomponent or subsystem thereof.

At block 322, a system (i.e., one or more of a computing system 400, a cloud provider 102, an enclave virtual machine 104, a model host 106, a key host 118, an encrypted volume 110, a customer computer system 112, a customer virtual machine 114, a customer key host 116, and/or any subcomponent or subsystem thereof) can and is configured to manage an artificial intelligence model lifecycle by implementing, via a trusted execution environment comprising an enclave virtual machine and a customer key host, a distributed privacy policy in which a master decryption key is split-shared between the trusted execution environment the customer key host. In some aspects, the enclave virtual machine can include a model host and a key host. In some aspects, the trusted execution environment can be co-managed by a first party and a second party. The parties may be model providers, data providers or other parties. In some aspects, a service provider may offer the trusted execution environment and other parties that use the trusted execution environment are the first party and the second party that co-manage the trusted execution environment.

In some aspects, the model host can be configured to run machine learning models on behalf of one of the first party or the second party.

In some aspects, the secure multiparty computation causes the first party having data $X_1$ and the second party having data $X_2$ to learn a computing result $C(X_1, X_2)$ without the first party revealing $X_1$ to the second party or the second party revealing $X_2$ to the first party. Further, in some aspects, $X_1$ and $X_2$ represent respective outputs from respective encryption algorithms operated by the first party or the second party.

At block 324, a system (i.e., one or more of a computing system 400, a cloud provider 102, an enclave virtual machine 104, a model host 106, a key host 118, an encrypted volume 110, a customer computer system 112, a customer virtual machine 114, a customer key host 116, and/or any subcomponent or subsystem thereof) can and is configured to manage an artificial intelligence model lifecycle by performing a decryption of the master decryption key according to the distributed privacy policy to obtain a decrypted master key.

At block 326, a system (i.e., one or more of a computing system 400, a cloud provider 102, an enclave virtual machine 104, a model host 106, a key host 118, an encrypted volume 110, a customer computer system 112, a customer virtual machine 114, a customer key host 116, and/or any subcomponent or subsystem thereof) can and is configured to manage an artificial intelligence model lifecycle by, based on the decrypted master key, performing, in the trusted execution environment, a private collaborative computation using one or more of customer data and a customer model. In some aspects, the private collaborative computation can include one of more of accessing data, providing a model and authorizing a computation. The distributed privacy policy can implement a secure multiparty computation between a first party and a second party to exchange data to decrypt the master decryption key.

In some aspects, a system for offering a secure model as a service can include at least one memory; and at least one processor coupled to the at least one memory and configured to: implement, via a trusted execution environment comprising an enclave virtual machine and a customer key host, a distributed privacy policy in which a master decryption key is split-shared between the trusted execution environment the customer key host; perform a decryption of the master decryption key according to the distributed privacy policy to obtain a decrypted master key; and, based on the decrypted master key, perform, in the trusted execution environment, a private collaborative computation using one or more of customer data and a customer model.

In some aspects, a non-transitory computer-readable medium having stored thereon instructions that, when executed by one or more processors, cause the one or more processors to: initialize, by a service provider and in a secure virtual machine compute enclave, a model host from an image that has secure software preinstalled and configured to start on boot; connect the model host to block storage volumes that are mounted with an encrypted file system; provide a key host to the secure virtual machine compute enclave, the key host providing an implementation of a component that ensures that encryption and decryption operations require participation both by a first party and a second party; provide a customer key host to a customer computer system; run, by the encrypted file system, a hardware attestation report comprising a cryptographically signed statement validating that the model host is running on a genuine processor manufactured by an enclave manufacturer with a secure compute element enabled and that guest measurements were taken of the secure virtual machine compute enclave to obtain a report; transmit, from the encrypted file system and to the key host, the report to signal that it is safe to participate in decryption of the encrypted file system used by the model host; and initiate a trusted execution environment on the secure virtual machine compute enclave by implementing a distributed access policy enforcement to the secure virtual machine compute enclave between at least two the first party and the second party for data access or computation authorization in which both the first party and the second party exchange data to unlock a master decryption key.

Disclosed are a system and method for combining a TEE and a multiparty computation scheme such as SMPC to build an environment for secure computation, where the environment is co-managed by distrusting parties. In this context, no single party has substantial unilateral control over the environment. The disclosed approach allows a service provider to offer "secure models as a service" to enterprises, simplifying management of models for enterprises without enterprises needing to trust the service provider or other participants in the process.

With the good performance of TEEs. secure co-management of TEEs has many applications, including distributing privacy policy enforcement across intra-enterprise stakeholders and enabling private collaborative computations. In some aspects, the disclosed approach uses SMPC to distribute access to data on the TEE and authorize computations, preferably using SMPC (or ZSM) to unlock data by first unlocking a master decryption key. In some aspects, fine-grained transaction-specific unlocking mechanisms are also possible. For example, one particular transaction such as a payment, or applying a model to specific data or subsets of data, can be used in a more fine-grained way than just generally providing access to a model with a batch of data.

The use of enclaves has become commonplace in industry to protect the memory of running computation. However, as noted above, the current use of enclaves do not on their own provide any protection for data stored at rest. Conversely, tools have existed for decades to allow for the protection of data at rest, but not data in use. By leveraging decryption keys that are split-shared, as is the case with ZSM, the disclosed system is able to link the two domains together and create a single environment in which data is encrypted both at-rest and in-use.

In addition, because decryption keys have been split-shared, a service provider is able to mathematically guarantee that the owner of the virtual machine is notified each time something about the virtual machine is altered (e.g. upgrade, restart). Since they are required to participate in the decryption process.

The disclosed methodology is not limited to secure enclaves that are in production today such as AMD SNP or Intel TDX. As other hardware manufactures devise their own enclave solutions, the environment that can be provided can and will be extended to accommodate them. As an example, Nvidia's H100 GPU now features an enclave similar to offerings from AMD and Intel. It is possible to extend the disclosed environment to include data that is shipped to the GPU.

Figure 4:
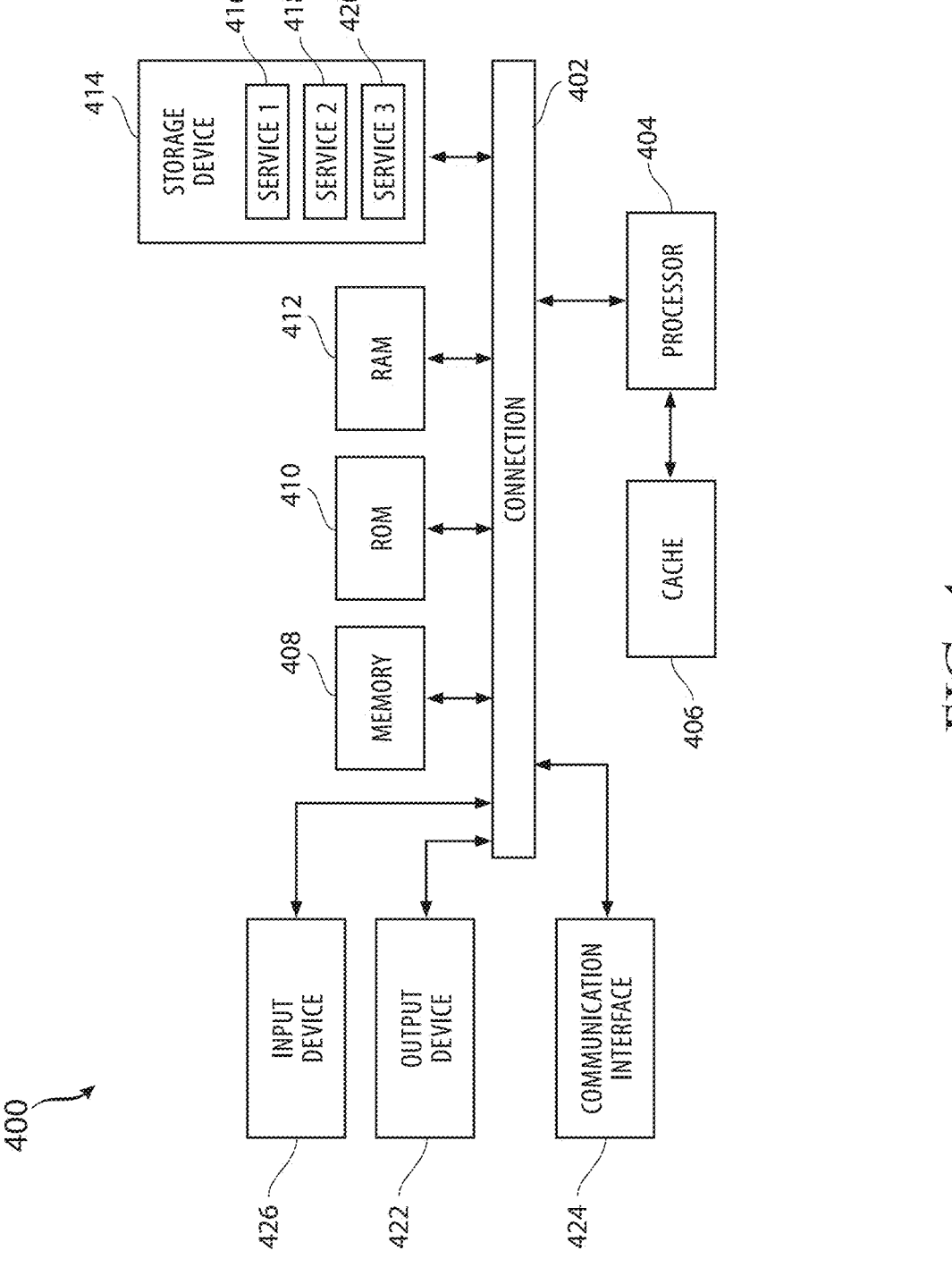
FIG. 4 shows an example of a system for implementing certain aspects of the present technology.

FIG. 4 shows an example of computing system 400, which can be for example any computing device making up any of the computing devices discussed herein or in the attached paper, or any component thereof in which the components of the system are in communication with each other using connection 402. Connection 402 can be a physical connection via a bus, or a direct connection into processor 404, such as in a chipset architecture. Connection 402 can also be a virtual connection, networked connection, or logical connection.

In some embodiments, computing system 400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 400 includes at least one processing unit (CPU or processor) 404 and connection 402 that couples various system components including system memory 408, such as read-only memory (ROM) 410 and random access memory (RAM) 412 to processor 404. Computing system 400 can include a cache of high-speed memory 406 connected directly with, in close proximity to, or integrated as part of processor 404.

Processor 404 can include any general purpose processor and a hardware service or software service, such as services 416, 418, and 420 stored in storage device 414, configured to control processor 404 as well as a special-purpose processor where software instructions are incorporated into the actual processor design. Processor 404 may essentially be a completely self-contained computing system, containing multiple cores or processors, a bus, memory controller, cache, etc. A multi-core processor may be symmetric or asymmetric.

To enable user interaction, computing system 400 includes an input device 426, which can represent any number of input mechanisms, such as a microphone for speech, a touch-sensitive screen for gesture or graphical input, keyboard, mouse, motion input, speech, etc. Computing system 400 can also include output device 422, which can be one or more of a number of output mechanisms known to those of skill in the art. In some instances, multimodal systems can enable a user to provide multiple types of input/output to communicate with computing system 400. Computing system 400 can include communication interface 424, which can generally govern and manage the user input and system output. There is no restriction on operating on any particular hardware arrangement, and therefore the basic features here may easily be substituted for improved hardware or firmware arrangements as they are developed.

Storage device 414 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 414 can include software services, servers, services, etc., that when the code that defines such software is executed by the processor 404, it causes the system to perform a function. In some embodiments, a hardware service that performs a particular function can include the software component stored in a computer-readable medium in connection with the necessary hardware components, such as processor 404, connection 402, output device 422, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Claim clauses of this disclosure include:

Clause 1. A method of managing an artificial intelligence model lifecycle, the method comprising: initializing, by a service provider and in a secure virtual machine compute enclave, a model host from an image that has secure software preinstalled and configured to start on boot; connecting the model host to block storage volumes that are mounted with an encrypted file system; providing a key host to the secure virtual machine compute enclave, the key host providing an implementation of a component that ensures that encryption and decryption operations require participation both by a first party and a second party; providing a customer key host to a customer computer system; running, by the encrypted file system, a hardware attestation report comprising a cryptographically signed statement validating that the model host is running on a genuine processor manufactured by an enclave manufacturer with a secure compute element enabled and that guest measurements were taken of the secure virtual machine compute enclave to obtain a report; transmitting, from the encrypted file system and to the key host, the report to signal that it is safe to participate in decryption of the encrypted file system used by the model host; and initiating a trusted execution environment on the secure virtual machine compute enclave by implementing a distributed access policy enforcement to the secure virtual machine compute enclave between at least two the first party and the second party for data access or computation authorization in which both the first party and the second party exchange data to unlock a master decryption key.

Clause 2. The method of clause 1, wherein the image only comprises the secure software for networking and has all other networking software removed including an open secure shell server.

Clause 3. The method of clause 1 or any previous clause, wherein the image comprises the guest measurements as defined by a hardware secure compute element.

Clause 4. The method of clause 1 or any previous clause, wherein the secure software comprises a white list of allowable operations.

Clause 5. The method of clause 1 or any previous clause, wherein the model host is configured to run machine learning models on behalf of one of the first party or the second party.

Clause 6. The method of clause 1 or any previous clause, wherein the distributed access policy enforcement to the secure virtual machine compute enclave between at least two the first party and the second party comprises using secure multiparty computations between the first party and the second party exchange data to unlock the master decryption key.

Clause 7. The method of clause 6 or any previous clause, wherein the secure multiparty computations cause the first party having data $X_1$ and the second party having data $X_2$ to learn a computing result $C(X_1, X_2)$ without the first party revealing $X_1$ to the second party or the second party revealing $X_2$ to the first party.

Clause 8. The method of clause 6 or any previous clause, wherein $X_1$ and $X_2$ represent respective outputs from respective encryption algorithms operated by the first party or the second party.

Clause 9. A system for managing an artificial intelligence model lifecycle, the system comprising: at least one memory; and at least one processor coupled to the at least one memory and configured to: initialize, by a service provider and in a secure virtual machine compute enclave, a model host from an image that has secure software preinstalled and configured to start on boot; connect the model host to block storage volumes that are mounted with an encrypted file system; provide a key host to the secure virtual machine compute enclave, the key host providing an implementation of a component that ensures that encryption and decryption operations require participation both by a first party and a second party; provide a customer key host to a customer computer system; run, by the encrypted file system, a hardware attestation report comprising a cryptographically signed statement validating that the model host is running on a genuine processor manufactured by an enclave manufacturer with a secure compute element enabled and that guest measurements were taken of the secure virtual machine compute enclave to obtain a report; transmit, from the encrypted file system and to the key host, the report to signal that it is safe to participate in decryption of the encrypted file system used by the model host; and initiate a trusted execution environment on the secure virtual machine compute enclave by implementing a distributed access policy enforcement to the secure virtual machine compute enclave between at least two the first party and the second party for data access or computation authorization in which both the first party and the second party exchange data to unlock a master decryption key.

Clause 10. The system of clause 9, wherein the image only comprises the secure software for networking and has all other networking software removed including an open secure shell server.

Clause 11. The system of clause 9 or any previous clause, wherein the image comprises the guest measurements as defined by a hardware secure compute element.

Clause 12. The system of clause 9 or any previous clause, wherein the secure software comprises a white list of allowable operations.

Clause 13. The system of clause 9 or any previous clause, wherein the model host is configured to run machine learning models on behalf of one of the first party or the second party.

Clause 14. The system of clause 9 or any previous clause, wherein the distributed access policy enforcement to the secure virtual machine compute enclave between at least two the first party and the second party comprises using secure multiparty computations between the first party and the second party exchange data to unlock the master decryption key.

Clause 15. The system of clause 14 or any previous clause, wherein the secure multiparty computations cause the first party having data $X_1$ and the second party having data $X_2$ to learn a computing result $C(X_1, X_2)$ without the first party revealing $X_1$ to the second party or the second party revealing $X_2$ to the first party.

Clause 16. The system of clause 14 or any previous clause, wherein $X_1$ and $X_2$ represent respective outputs from respective encryption algorithms operated by the first party or the second party.

Clause 17. A non-transitory computer-readable medium having stored thereon instructions that, when executed by one or more processors, cause the one or more processors to: initialize, by a service provider and in a secure virtual machine compute enclave, a model host from an image that has secure software preinstalled and configured to start on boot; connect the model host to block storage volumes that are mounted with an encrypted file system; provide a key host to the secure virtual machine compute enclave, the key host providing an implementation of a component that ensures that encryption and decryption operations require participation both by a first party and a second party; provide a customer key host to a customer computer system; run, by the encrypted file system, a hardware attestation report comprising a cryptographically signed statement validating that the model host is running on a genuine processor manufactured by an enclave manufacturer with a secure compute element enabled and that guest measurements were taken of the secure virtual machine compute enclave to obtain a report; transmit, from the encrypted file system and to the key host, the report to signal that it is safe to participate in decryption of the encrypted file system used by the model host; and initiate a trusted execution environment on the secure virtual machine compute enclave by implementing a distributed access policy enforcement to the secure virtual machine compute enclave between at least two the first party and the second party for data access or computation authorization in which both the first party and the second party exchange data to unlock a master decryption key.

Clause 18. The non-transitory computer-readable medium of clause 17, wherein the image only comprises the secure software for networking and has all other networking software removed including an open secure shell server.

Clause 19. The non-transitory computer-readable medium of clause 17 or any previous clause, wherein the image comprises the guest measurements as defined by a hardware secure compute element.

Clause 20. The non-transitory computer-readable medium of clause 17 or any previous clause, wherein the secure software comprises a white list of allowable operations.

Clause 21. The non-transitory computer-readable medium of clause 17 or any previous clause, wherein the model host is configured to run machine learning models on behalf of one of the first party or the second party.

Clause 22. The non-transitory computer-readable medium of clause 17 or any previous clause, wherein the distributed access policy enforcement to the secure virtual machine compute enclave between at least two the first party and the second party comprises using secure multiparty computations between the first party and the second party exchange data to unlock the master decryption key.

Clause 23. The non-transitory computer-readable medium of clause 22 or any previous clause, wherein the secure multiparty computations cause the first party having data $X_1$ and the second party having data $X_2$ to learn a computing result $C(X_1, X_2)$ without the first party revealing $X_1$ to the second party or the second party revealing $X_2$ to the first party.

Clause 24. The non-transitory computer-readable medium of clause 22 or any previous clause, wherein $X_1$ and $X_2$ represent respective outputs from respective encryption algorithms operated by the first party or the second party.

Clause 25. A method of providing secure models as a service, the method comprising: implementing, via a trusted execution environment comprising an enclave virtual machine and a customer key host, a distributed privacy policy in which a master decryption key is split-shared between the trusted execution environment the customer key host; performing a decryption of the master decryption key according to the distributed privacy policy to obtain a decrypted master key; and based on the decrypted master key, performing, in the trusted execution environment, a private collaborative computation using one or more of customer data and a customer model.

Clause 26. The method of clause 25, wherein the enclave virtual machine comprises a model host and a key host.

Clause 27. The method of clause 25 or any previous clause, wherein the private collaborative computation comprises one of more of accessing data, providing a model and authorizing a computation.

Clause 28. The method of clause 25 or any previous clause, wherein the trusted execution environment is co-managed by a first party and a second party.

Clause 29. The method of clause 26 or any previous clause, wherein the model host is configured to run machine learning models on behalf of one of a first party or a second party.

Clause 30. The method of clause 25 or any previous clause, wherein the distributed privacy policy implements a secure multiparty computation between a first party and a second party to exchange data to decrypt the master decryption key.

Clause 31. The method of clause 30 or any previous clause, wherein the secure multiparty computation causes the first party having data $X_1$ and the second party having data $X_2$ to learn a computing result $C(X_1, X_2)$ without the first party revealing $X_1$ to the second party or the second party revealing $X_2$ to the first party.

Clause 32. The method of clause 31 or any previous clause, wherein $X_1$ and $X_2$ represent respective outputs from respective encryption algorithms operated by the first party or the second party.

Clause 33. A system for offering a secure model as a service, the system comprising: at least one memory; and at least one processor coupled to the at least one memory and configured to: implement, via a trusted execution environment comprising an enclave virtual machine and a customer key host, a distributed privacy policy in which a master decryption key is split-shared between the trusted execution environment the customer key host; perform a decryption of the master decryption key according to the distributed privacy policy to obtain a decrypted master key; and based on the decrypted master key, perform, in the trusted execution environment, a private collaborative computation using one or more of customer data and a customer model.

Clause 34. The system of clause 33, wherein the enclave virtual machine comprises a model host and a key host.

Clause 35. The system of clause 33 or any previous clause, wherein the private collaborative computation comprises one of more of accessing data, providing a model and authorizing a computation.

Clause 36. The system of clause 33 or any previous clause, wherein the trusted execution environment is co-managed by a first party and a second party.

Clause 37. The system of clause 34 or any previous clause, wherein the model host is configured to run machine learning models on behalf of one of a first party or a second party.

Clause 38. The system of clause 33 or any previous clause, wherein the distributed privacy policy implements a secure multiparty computation between a first party and a second party to exchange data to decrypt the master decryption key.

Clause 39. The system of clause 38 or any previous clause, wherein the secure multiparty computation causes the first party having data $X_1$ and the second party having data $X_2$ to learn a computing result $C(X_1, X_2)$ without the first party revealing $X_1$ to the second party or the second party revealing $X_2$ to the first party.

Clause 40. The system of clause 39 or any previous clause, wherein $X_1$ and $X_2$ represent respective outputs from respective encryption algorithms operated by the first party or the second party.

Clause 41. A non-transitory computer-readable medium having stored thereon instructions that, when executed by one or more processors, cause the one or more processors to: implement, via a trusted execution environment comprising an enclave virtual machine and a customer key host, a distributed privacy policy in which a master decryption key is split-shared between the trusted execution environment the customer key host; perform a decryption of the master decryption key according to the distributed privacy policy to obtain a decrypted master key; and based on the decrypted master key, perform, in the trusted execution environment, a private collaborative computation using one or more of customer data and a customer model.

Clause 42. The non-transitory computer-readable medium of clause 41, wherein the enclave virtual machine comprises a model host and a key host.

Clause 43. The non-transitory computer-readable medium of clause 41 or any previous clause, wherein the private collaborative computation comprises one of more of accessing data, providing a model and authorizing a computation.

Clause 44. The non-transitory computer-readable medium of clause 41 or any previous clause, wherein the trusted execution environment is co-managed by a first party and a second party.

Clause 45. The non-transitory computer-readable medium of clause 42 or any previous clause, wherein the model host is configured to run machine learning models on behalf of one of a first party or a second party.

Clause 46. The non-transitory computer-readable medium of clause 41 or any previous clause, wherein the distributed privacy policy implements a secure multiparty computation between a first party and a second party to exchange data to decrypt the master decryption key.

Clause 47. The non-transitory computer-readable medium of clause 46 or any previous clause, wherein the secure multiparty computation causes the first party having data $X_1$ and the second party having data $X_2$ to learn a computing result $C(X_1, X_2)$ without the first party revealing $X_1$ to the second party or the second party revealing $X_2$ to the first party.

Clause 48. The non-transitory computer-readable medium of clause 47 or any previous clause, wherein $X_1$ and $X_2$ represent respective outputs from respective encryption algorithms operated by the first party or the second party.

We claim:

1. A method of managing an artificial intelligence model lifecycle, the method comprising:

initializing, by a service provider and in a secure virtual machine compute enclave, a model host from an image that has secure software preinstalled and configured to start on boot;

connecting the model host to block storage volumes that are mounted with an encrypted file system;

providing a key host to the secure virtual machine compute enclave, the key host providing an implementation of a component that ensures that encryption and decryption operations require participation both by a first party and a second party;

providing a customer key host to a customer computer system;

running, by the encrypted file system, a hardware attestation report comprising a cryptographically signed statement validating that the model host is running on a genuine processor manufactured by an enclave manufacturer with a secure compute element enabled and that guest measurements were taken of the secure virtual machine compute enclave to obtain a report;

transmitting, from the encrypted file system and to the key host, the report to signal that participation in decryption of the encrypted file system used by the model host is safe; and initiating a trusted execution environment on the secure virtual machine compute enclave by implementing distributed access policy enforcement between the first party and the second party, for data access or computation authorization in which both the first party and the second party exchange data to unlock a master decryption key.

2. The method of claim 1, wherein the image only comprises the secure software for networking and has all other networking software removed including an open secure shell server.

3. The method of claim 1, wherein the image comprises the guest measurements as defined by a hardware secure compute element.

4. The method of claim 1, wherein the secure software comprises a white list of allowable operations.

5. The method of claim 1, wherein the model host is configured to run machine learning models on behalf of one of the first party or the second party.

6. The method of claim 1, wherein the distributed access policy enforcement between the first party and the second party comprises using secure multiparty computations between the first party and the second party exchange data to unlock the master decryption key.

7. The method of claim 6, wherein the secure multiparty computations cause the first party having data $X_1$ and the second party having data $X_2$ to learn a computing result $C(X_1, X_2)$ without the first party revealing $X_1$ to the second party or the second party revealing $X_2$ to the first party.

8. The method of claim 6, wherein $X_1$ and $X_2$ represent respective outputs from respective encryption algorithms operated by the first party or the second party.

9. A system for managing an artificial intelligence model lifecycle, the system comprising:

at least one memory; and at least one processor coupled to the at least one memory and configured to:

initialize, by a service provider and in a secure virtual machine compute enclave, a model host from an image that has secure software preinstalled and configured to start on boot;

connect the model host to block storage volumes that are mounted with an encrypted file system;

provide a key host to the secure virtual machine compute enclave, the key host providing an implementation of a component that ensures that encryption and decryption operations require participation both by a first party and a second party;

provide a customer key host to a customer computer system;

run, by the encrypted file system, a hardware attestation report comprising a cryptographically signed statement validating that the model host is running on a genuine processor manufactured by an enclave manufacturer with a secure compute element enabled and that guest measurements were taken of the secure virtual machine compute enclave to obtain a report;

transmit, from the encrypted file system and to the key host, the report to signal that participation in decryption of the encrypted file system used by the model host is safe; and initiate a trusted execution environment on the secure virtual machine compute enclave by implementing distributed access policy enforcement between the first party and the second party, for data access or computation authorization in which both the first party and the second party exchange data to unlock a master decryption key.

10. The system of claim 9, wherein the image only comprises the secure software for networking and has all other networking software removed including an open secure shell server.

11. The system of claim 9, wherein the image comprises the guest measurements as defined by a hardware secure compute element.

12. The system of claim 9, wherein the secure software comprises a white list of allowable operations.

13. The system of claim 9, wherein the model host is configured to run machine learning models on behalf of one of the first party or the second party.

14. The system of claim 9, wherein the distributed access policy enforcement between the first party and the second party comprises using secure multiparty computations between the first party and the second party exchange data to unlock the master decryption key.

15. The system of claim 14, wherein the secure multiparty computations cause the first party having data $X_1$ and the second party having data $X_2$ to learn a computing result $C(X_1, X_2)$ without the first party revealing $X_1$ to the second party or the second party revealing $X_2$ to the first party.

16. The system of claim 14, wherein $X_1$ and $X_2$ represent respective outputs from respective encryption algorithms operated by the first party or the second party.

17. A non-transitory computer-readable medium having stored thereon instructions that, when executed by one or more processors, cause the one or more processors to:

initialize, by a service provider and in a secure virtual machine compute enclave, a model host from an image that has secure software preinstalled and configured to start on boot;

connect the model host to block storage volumes that are mounted with an encrypted file system;

provide a key host to the secure virtual machine compute enclave, the key host providing an implementation of a component that ensures that encryption and decryption operations require participation both by a first party and a second party;

provide a customer key host to a customer computer system;

run, by the encrypted file system, a hardware attestation report comprising a cryptographically signed statement validating that the model host is running on a genuine processor manufactured by an enclave manufacturer with a secure compute element enabled and that guest measurements were taken of the secure virtual machine compute enclave to obtain a report;

transmit, from the encrypted file system and to the key host, the report to signal that participation in decryption of the encrypted file system used by the model host is safe; and initiate a trusted execution environment on the secure virtual machine compute enclave by implementing distributed access policy enforcement between the first party and the second party, for data access or computation authorization in which both the first party and the second party exchange data to unlock a master decryption key.

18. The non-transitory computer-readable medium of claim 17, wherein the distributed access policy enforcement between the first party and the second party comprises using secure multiparty computations between the first party and the second party exchange data to unlock the master decryption key.

19. The non-transitory computer-readable medium of claim 18, wherein the secure multiparty computations cause the first party having data $X_1$ and the second party having data $X_2$ to learn a computing result $C(X_1, X_2)$ without the first party revealing $X_1$ to the second party or the second party revealing $X_2$ to the first party.

20. The non-transitory computer-readable medium of claim 18, wherein $X_1$ and $X_2$ represent respective outputs from respective encryption algorithms operated by the first party or the second party.

* * * * *